Oct. 22, 1940.   M. F. SILVA   2,219,057
WINDMILL
Filed July 3, 1939
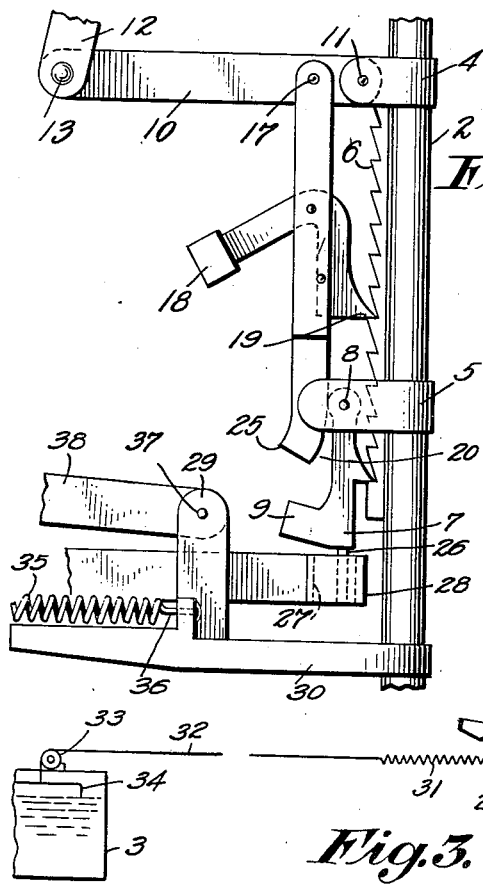
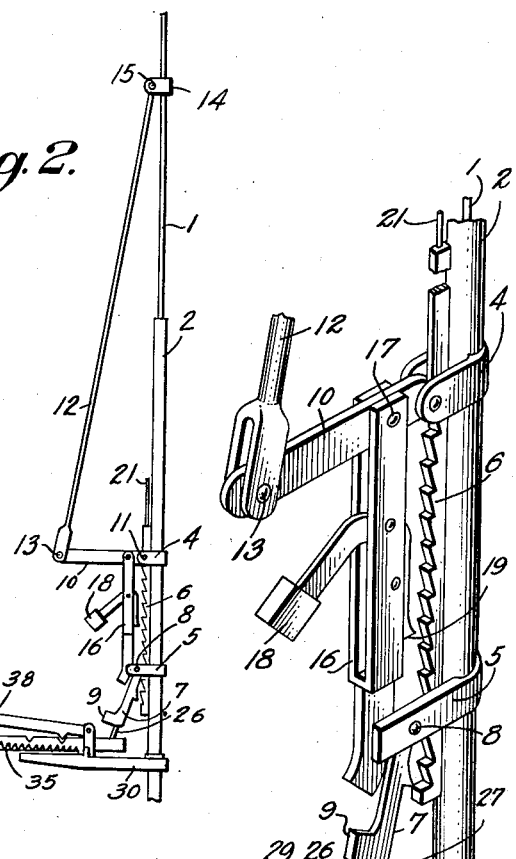
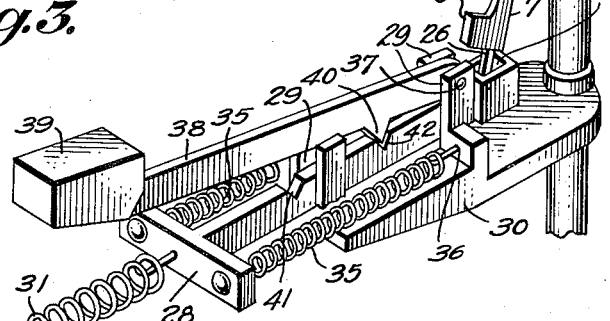
Fig. 2.
Fig. 3.
Fig. 1.
Inventor.
Manuel F. Silva
John A. Naismith
Attorney Patented Oct. 22, 1940

2,219,057

UNITED STATES PATENT OFFICE 2,219,057

WINDMILL

Manuel F. Silva, near Hollister, Calif.

Application July 3, 1939, Serial No. 282,608

4 Claims. (Cl. 103—28)

The present invention relates particularly to means for controlling the operation of a windmill, and it is the object of the invention to provide means for automatically swinging the windmill out of the wind when the water receiving tank has been filled to the required height, and to automatically release the windmill into an operative position to operate the pump when the water in the tank has dropped to a predetermined level.

It is also an object of the invention to provide means of the character indicated that will be simple in form and construction, economical to manufacture, that consists of few parts, that is strong, durable, and highly efficient in its practical application.

In the drawing:

Figure 1 is a perspective illustration of a portion of the mechanism embodying my invention in the position assumed when the pump is in operation.

Figure 2 is a side elevation of a portion of the mechanism embodying my invention in the position assumed when stopping the operation of the pump.

Figure 3 is a diagrammatical illustration showing the operating connections of the mechanism shown in the Figures 1 and 2.

In the particular embodiment of the invention herein disclosed, I show a portion of the pump rod at 1 operating in the pipe 2, the reservoir or tank being indicated in part at 3.

Rigidly mounted on the pipe 2 are brackets 4 and 5 which form guides for a ratchet 6, the ratchet being disposed to slide vertically against the exterior of the pipe 2. On the bracket 5 is pivotally mounted a dog 7 as at 8, this dog being weighted as at 9 so as to normally swing into a vertical position, in which position it engages the ratchet 6.

On bracket 4 is pivotally mounted a lever 10 as at 11, this lever being operated by means of a link 12 pivotally connected thereto as at 13 and fixedly attached to the pump rod 1 by means of a band 14 to which it is pivoted at 15.

A second dog 16 is pivotally mounted on lever 10 as at 17 to depend therefrom, being weighted as at 18 to normally throw the tooth 19 into engagement with the ratchet 6. The lower end of the dog 16 has sliding engagement with the outer edge of dog 7, and these parts are so formed and proportioned that when the dog 7 is in a vertical position as shown in Figure 2, operation of the lever 10 will cause the tooth 19 to engage a tooth on the ratchet and force it downwardly, at the same time the dog 16 will slide into engagement with the next tooth on the ratchet and hold it down while the dog 16 slides into engagement with the next upper tooth to repeat the operation. The spacing and conformation between the two dogs at 20 permit the swinging of dog 7 without disengaging the dog 16.

Since the ratchet 6 is attached to the wire 21 at 22 the step-by-step downward movement of the ratchet as above described gradually pulls the windmill into an inoperative position, but since the wire 21 is a part of the standard equipment of a windmill its connections thereto are not shown. When the windmill ceases to operate the dog 7 is still in engagement with the ratchet, and so remains until disconnected therefrom as hereinafter described.

When the dog 7 is swung out of engagement with the ratchet 6 as shown in Figure 1 then its rear or outer edge assumes the position shown in dotted lines at 23 and engages the lower end of dog 16 at 24, thereby moving the dog 16 outwardly as indicated in dotted lines at 25. This adjustment disengages the tooth 19 from the ratchet 6 and holds it in the disengaged position, operation of the lever 10 merely sliding the dog 16 up and down on the dog 7. With the dogs 7 and 16 in this position the ratchet is free to move and the windmill is permitted to swing into the wind in the normal manner.

To automatically adjust the dog 7 in either one of its two positions to accomplish the results above set forth, I provide a pin 26 on the bottom end thereof, and this pin engages a socket 27 on a slidable bar 28.

The bar 28 slides between upright guides 29 on a horizontally disposed plate 30 which is fixedly mounted on the pipe 2. To the forward end of bar 28 is attached a tension spring 31, its other end being attached to a pull wire 32 which passes over a pulley 33 on reservoir 3 and is attached to a float 34 in said reservoir.

Attached to the forward end of bar 28 are smaller springs 35, these springs being also attached to the plate 30 as at 36.

Pivotally mounted on the inner upright guides 29 as at 37 is an arm 38 weighted at 39. The arm 38 has a tooth 40 formed thereon to engage either of the two notches 41 or 42 formed in the upper edge of bar 28, the notches being spaced apart a distance equal to the desired movement of the bar 28.

Assuming that the windmill is in operation, with the water level rising in tank 3 and the dogs 7 and 16 disengaged as shown in Figure 1, the tension on spring 31 is gradually released but the bar 28 remains stationary because the pull of springs 35 is not sufficient to disengage the arm 38 from notch 42. But these parts are so adjusted that when the tank 3 is filled and the float is raised accordingly, the tension of spring 31 is suddenly overcome by the pull of springs 35 and the bar 28 is snapped back until the tooth 40 drops into notch 41. This sudden movement of bar 28 swings the dog 7 into engagement with the ratchet 6 and permits the dog 16 to engage the ratchet, thereby causing the windmill to be swung out of the wind as hereinbefore described. When the water level in the tank 3 drops again to a given level the tension on spring 31 increases to a point where it overcomes the restraining action of the springs 35 and arm 38, the bar 28 is snapped outwardly and the windmill is again released to the wind.

Although a certain specific embodiment of the invention has been herein illustrated and described, it will be understood that various alterations in the details of construction and mode of assembly may be made without departing from the scope of the invention as indicated in the appended claims.

I claim:

1. The combination with a windmill structure and a water tank supplied by the operation of the windmill, of a slidable ratchet urged in one direction by the windmill swinging into the wind, a windmill operated dog operative to engage the ratchet and urge the same in the opposite direction, a second dog operatively associated with the ratchet to hold the same against movement in the first direction, means operative to urge the dogs alternately into and out of engagement with the ratchet when the windmill is in operation and the float is elevated by the water level in the tank, and float actuated means operative to disengage both dogs from engagement with the ratchet when the float is lowered a given distance by the lowering of the water level in the tank.

2. The combination with a windmill structure and a water tank supplied by the operation of the windmill, of a slidable ratchet urged in one direction by the windmill swinging into the wind, a windmill operated and weighted dog operative to engage the ratchet and urge the same in the opposite direction, a second weighted dog operatively associated with the ratchet to hold the same against movement in the first mentioned direction and disposed to underlie in part and engage the first mentioned dog, and formed to disengage the first dog from the ratchet when the said second dog is disengaged from the ratchet, float actuated means operative to move the second mentioned dog out of engagement with the ratchet when the float is lowered a given distance by the lowering of the water level in the tank, and float actuated means operative to permit engagement of the second dog with the ratchet when the float is elevated a given distance by the rising of the water level in the tank.

3. The combination with a windmill structure and a water tank supplied by the operation of the mill, of a slidable ratchet urged in one direction by the windmill swinging into the wind, a windmill operated dog operative to engage the ratchet and urge the same in the opposite direction, a second dog operatively associated with the ratchet to hold the same against movement in the first direction, means operative to urge the dogs alternately into and out of engagement with the ratchet when the windmill is in operation and the float is elevated by the water level in the tank, and float actuated means operative to disengage both dogs from engagement with the ratchet when the float is lowered a given distance by the lowering of the water level in the tank and to return both dogs into engagement with the ratchet when the float is raised a given distance by the rising of the water level in the tank.

4. The structure set forth in claim 3 wherein the float actuated means comprises a support associated with the windmill, a bar slidably mounted thereon and connected to the dogs to adjust the same, spring means inserted between the bar and support to urge the bar in one direction, spring means inserted between the bar and float to urge the bar in the opposite direction, and means associated with the bar to bear thereon and delay its movement in either direction until overcome by the action of one of the spring means.

MANUEL F. SILVA.